March 22, 1960   A. LIPPMAN, JR., ET AL   2,929,747
METHOD FOR PRODUCING SOLUTIONS
Filed June 17, 1954   3 Sheets-Sheet 1

INVENTORS
Alfred Lippman Jr.,
BY Leon Godchaux II

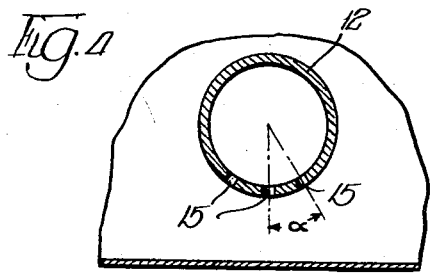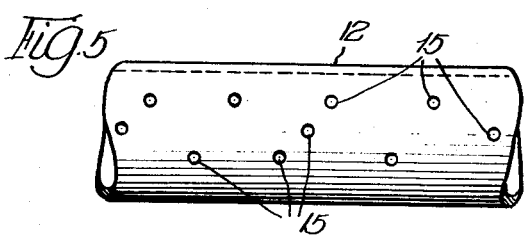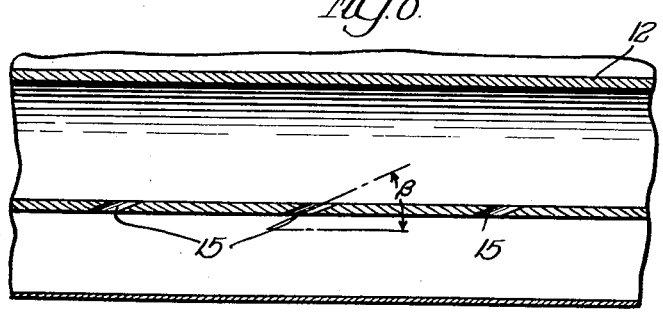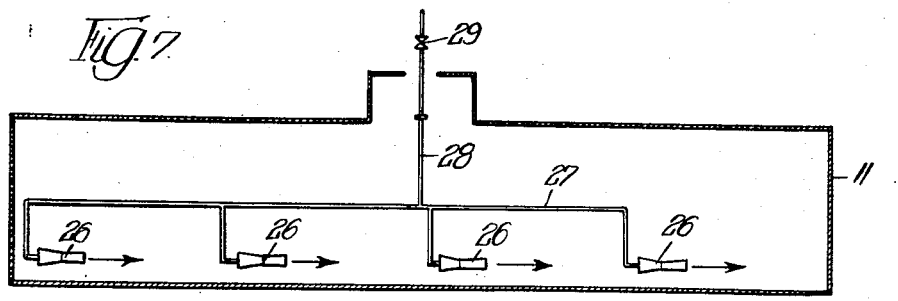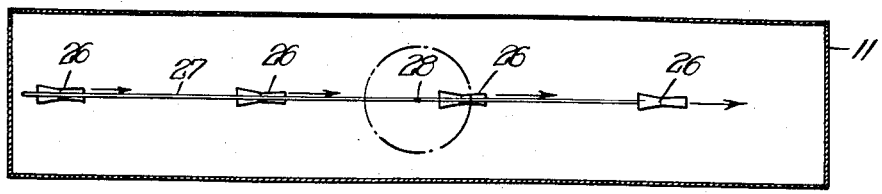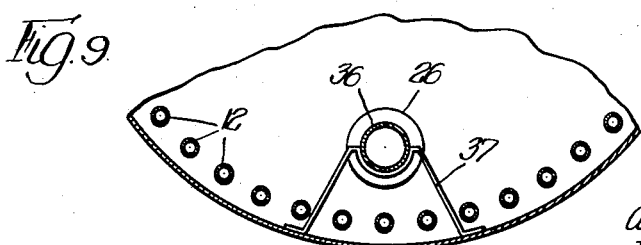

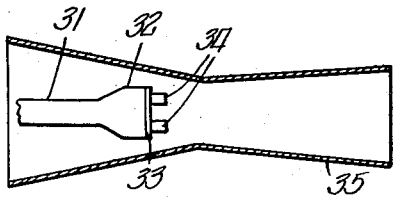
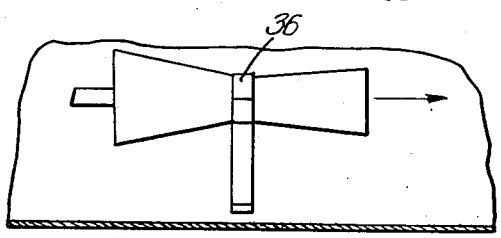
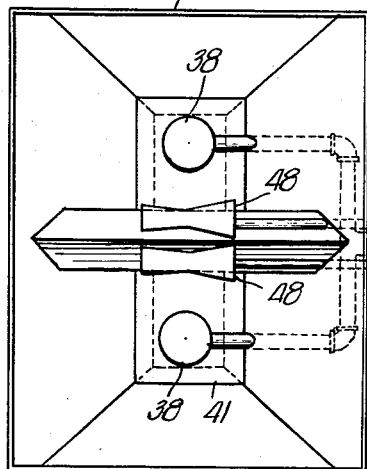
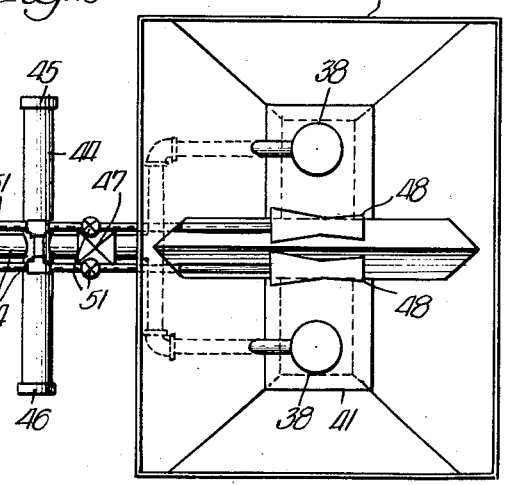
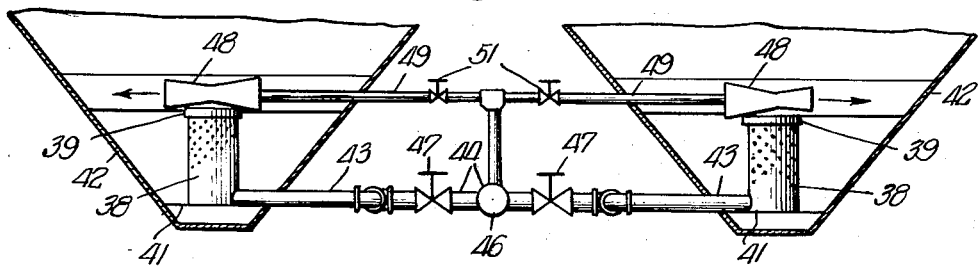

United States Patent Office 2,929,747
Patented Mar. 22, 1960

2,929,747

METHOD FOR PRODUCING SOLUTIONS

Alfred Lippman, Jr., Reserve, and Leon Godchaux II, New Orleans, La., assignors, by mesne assignments, to The National Sugar Refining Company, New York, N.Y., a corporation of New Jersey Application June 17, 1954, Serial No. 437,516

3 Claims. (Cl. 127—63)

This invention relates to a process and apparatus for the rapid dissolving of soluble materials such as sugar and the like.

In its broad aspects the process of our invention is directed to the rapid dissolving of all highly soluble materials which may be in granular, powder, or similar particulate form, which materials are characterized by their tendency to form impermeable layers or agglomerated lumps when such materials are mixed with a solvent therefor.

While not limited thereto, the present invention is particularly applicable to the production of liquid sugar, although the method, process, techniques and the apparatus on which this invention is based, are likewise applicable to the production of liquid forms of such materials as alum, sodium hydroxide, and similar materials which tend to behave similarly to sugar when contacted with a solvent.

The advantages realizable by commercial users of sugar such as food manufacturers and processors from the use in numerous situations, of liquid sugar instead of solid sugars, are substantial and are well known. However, transportation costs involved in moving liquid sugar, which are of course based upon the total weight of sugar and water, mitigate against its more wide spread use and are an important reason why liquid sugar is not readily available on a competitive basis with dry sugar, at least on any widespread scale. This can be understood when it is pointed out that the water contained in liquid sugar represents perhaps from ¼ to ⅓ of the gross weight.

One of the principal objects of this invention accordingly, is the provision of means for producing liquid sugar from solid sugar, at a substantially lower cost than heretofore possible.

A further object of this invention is to provide a method and apparatus for dissolving, on a satisfactory, commercial scale, large tonnages of sugar in a very short time.

A further object is to provide an improved technique for producing liquid sugar, which may be in a pasteurized or sterile state if desired.

A further object is to provide a method and apparatus for producing, within a vessel, a solution having a predetermined, uniform, concentration of dissolved solids.

In the production of sugar solutions for large scale commercial uses as in the baking, confectionery and similar food industries, the solid sugar is conventionally dissolved by adding the sugar solids to a hot agitated quantity of water. This common technique, however, has an important disadvantage based on the fact that when sugar is first introduced into water, it tends to form lumps or chunks of agglomerated particles which become glazed on the surface thereof and results in a retarding or inhibiting dissolution of the sugar. It appears that the water, which is usually hot in order to expedite solution, forms a concentrated solution when it first contacts the outer crystals of the lumps formed when sugar particles agglomerate. The solution penetrates inwardly in contact with more solid sugar and as it does the solid sugar within the mass cools and further saturates the solution having access to it, whereupon a point is reached at which cooling of the saturated solution takes place. This results in crystallization, the crystals being formed in the interstices among the sugar particles and acting as a "cement" for forming a difficultly permeable mass of material. Such a mass of "cemented" particles acts like a chunk or mass of solid sugar, having comparatively insignificant surface area for solution compared to that of the original discrete particles forming the chunk or mass, and because of this, the dissolving rate is low, requiring large agitators and vessels for effecting dissolution of such masses of material.

The present invention, in brief, involves dissolving solid granular materials such as sugar in a vessel equipped with means for providing a uniform flow of water or other solvent preferably hot, upwardly or downwardly under controlled conditions into the mass of granular material. The solvent contacting the granular material in accordance with our invention results in the formation of a free-flowing slurry without agglomeration, and permits ready dissolving of the solid material by conventional means such as through the use of heat or mechanical or fluid agitation. If desired, steam, hot air or the like may be used not only to hasten the dissolving process but to also pasteurize the solution, as well as to provide agitation for the mass.

Our invention is more particularly disclosed in the description set forth in detail hereinafter, and in the accompanying drawings, and comprises the features of construction, arrangement of parts, method of operation, and steps and combinations of steps hereinafter set forth.

In the drawings,

Figure 4 is a transverse cross-section of one of the sparger pipes shown in Figures 1, 2 and 3;

Figure 5 is a bottom view of the sparger pipe shown in Figure 4;

Figure 6 is a sectional elevation of the sparger pipe of Figures 4 and 5;

Figure 7 is an elevation of a railroad tank car showing the arrangement therein of steam circulators;

Figure 8 is a plan view of the tank car shown in Figure 7;

Figure 9 is a end view in cross-section of a portion of tank car adapted in accordance with the present invention;

Figure 10 is a view in elevation of a circulator;

Figure 11 is a side view of the circulator shown in Figure 9;

Figure 12 is a plan view of a portion of a hopper car adapted for use in carrying out the method of our invention; and Figure 13 is a sectional elevation of the hopper car of Figure 12.

Figure 1:
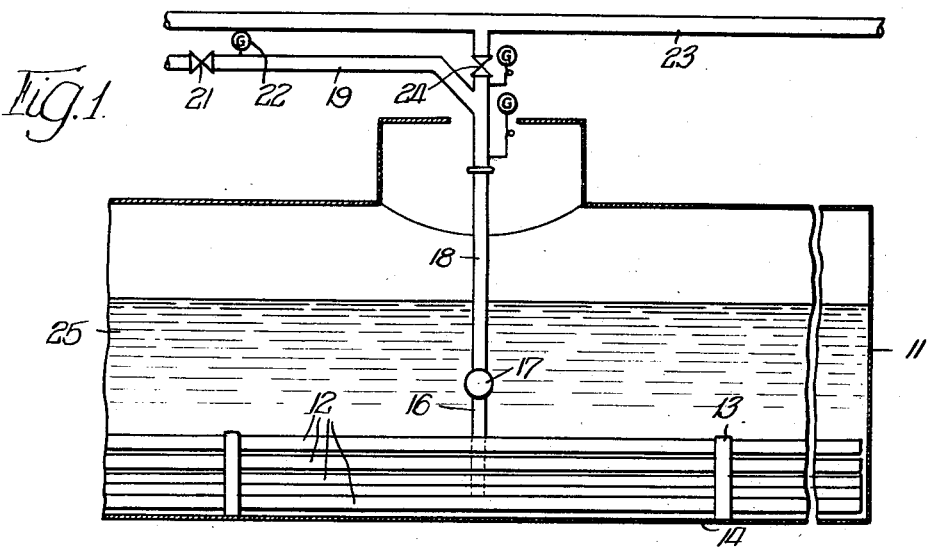
Figure 1 is a side elevation of a railroad tank car adapted for use in practicing our invention.
Figure 2:
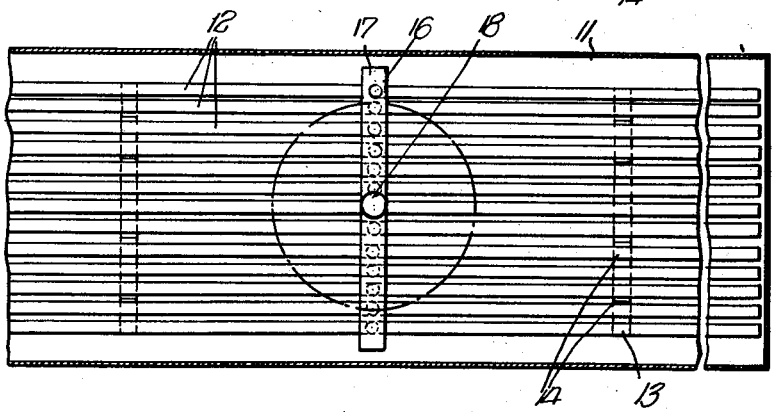
Figure 2 is a plan view of the tank car shown in Figure 1.
Figure 3:
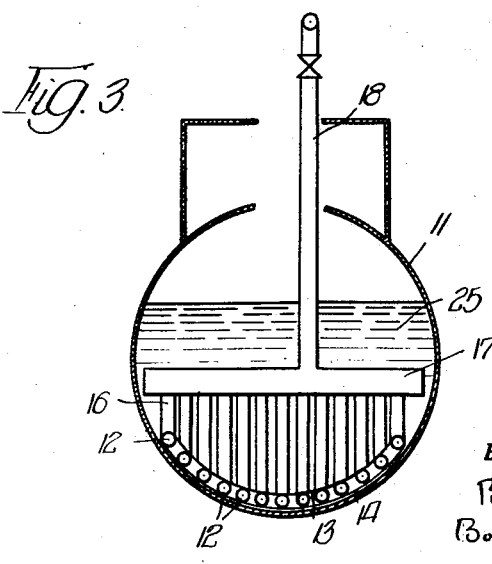
Figure 3 is a transverse cross-section of the tank car of Figure 2.

Referring now to the drawings and particularly Figures 1 through 11, the tank car 11 which is modified for use in practicing the method of this invention, is provided with a number of sparger pipes 12 positioned at the bottom of the car 11, there being conveniently, a space of about two inches between the bottom of the pipes 12 and the bottom of the car 11. Straps 13 and brackets 14 serve to support and space the pipes 12 properly. The pipes 12 may be from five to six inches apart at center lines.

The pipes 12 are perforated, for example with ⅛ inch holes 15, as shown in Figures 4, 5 and 6, to admit water, steam, compressed air or the like uniformly across the bottom of the car 11. Some of the perforations 15 are directed downwardly to agitate and dissolve solids which may be in the very bottom of the car.

Downcomer pipes 16 connect sparger pipes 12 with a header pipe 17; the downcomer pipes 16 may be of two inch diameter and the header 17, a six inch pipe. The solvent, water for example, and other fluid which may be used gains access to the header 17 through feed line 18, and is introduced into the feed line 18 through pipe 19 and valve 21. A gage 22 is positioned on the water supply line 19 to indicate the pressure. Steam may be introduced into the feed line 18 through a line 23 equipped with a valve 24.

The perforations directed downwardly are drilled at an angle "B" of about 22½° as shown in Figure 6. The holes in this single row are spaced about 4 inches apart, and their objective is to dissolve the sugar which is directly beneath the pipes 12. The other perforations on the outer row are at an angle "L" of about 45° as shown in Figure 4, are in great preponderance, and are spaced about 2 inches apart in each row, the holes in one row being staggered with respect to the holes on the other row, as shown in Figure 5. These perforations serve to provide a distributed blast of fluid which facilitates heating, agitation and dissolving of solid sugar in the bottom section of the car.

In practice, about 2500–3000 gallons of water is introduced under 3–5 lbs. pressure into the pipes of an 8,000 gallon car containing about 25 tons of solid sugar. The water is then ejected through the holes or perforation 15 into the mass of sugar 25 contained in the car 11. Water flowing upwardly displaces the air in the mass of sugar 25 and dissolves the solid sugar as it ascends. It is preferable to use hot water, at a temperature of for example 150–212° F., to facilitate the dissolving process. As the water ascends, the finer sugar crystals dissolve first leaving a slurry of larger residual crystals that descend to the bottom of the car 11, whereupon the jets of water emanating from the perforations 15, and which may number for example 7,000 effect a rapid solution of the sugar. It is seen that by this technique the more refractory crystals are placed in direct contact with high velocity streams of fresh solvent, which action results in a rapid solution of the sugar.

As has been pointed out, prior attempts to dissolve large tonnages of sugar rapidly, and by means of simple forms of apparatus were unsuccessful because of the formation of glazed, cement-like surfaces or layers that were formed on the sugar particles, and which prevented access or penetration of the dissolving water. Addition of water to the mass of sugar from the top, for example, resulted in forming a layer of viscous concentrated solution which did not displace any of the air within the interstices of the sugar particles, and was consequently held up by that air. In other words, the concentrated sugar solution which was formed from the first water to penetrate the sugar could penetrate only a relatively short distance from the top of the mass before it became immobilized due to the buoyant effect of the air. This immobilized or trapped strong solution then cooled, and crystallized within the mass of sugar, resulting in the formation of a marble-like slab through which further penetration could not take place readily.

We have observed that the rapid solution of a large mass of sugar in situ—and this is one important feature of our invention—can be efficiently effected only by first wetting the sugar crystals rapidly, before any substantial amount of localized crystallization can take place, so as to form a free-flowing slurry. Such a rapid wetting can be effected, either by causing an upward displacement of air within the mass of sugar particles as by introducing the solvent at or near the bottom of the mass of the sugar, or by the use of vacuum to eliminate the air, in which case the solvent can be introduced at either the top or the bottom of the sugar mass. With an adequate addition rate and uniform distribution of the solvent, localized conditions resulting in super saturation and the objectionable buildup of impermeable barriers to the solvent, such as the glazed slabs or chunks hereinbefore described, are substantially eliminated. In the preferred practice of the invention, the dissolving water flows upwardly at a uniform and rapid rate, through the mass of the sugar, and where a tank car of sugar is involved, may be added in as little as one minute or longer. Of course, in that case where some of the air is eliminated from the vessel containing the sugar to help in forming a free-flowing slurry and solvent water is added from the top, there is a loss of countercurrent dissolving action so that any residual material after addition of the solvent would have to be agitated, or steam or air added at the bottom to complete the solution.

In this way any substantial amount of localized crystallization is prevented and the sugar particles are uniformly and rapidly wetted to form a free-flowing slurry which can then be readily agitated and dissolved. The temporarily larger particles are wetted, remain temporarily in discrete form and move downwardly into contact with a rising stream of increasingly dilute solution until they finally contact rapidly moving "jets" of fresh solvent. It is seen then that one essential step in our invention is that the particles first be wetted and then surrounded with solvent at such a rate as to prevent crystallization and to assure the relatively free mobility of each particle.

Of course, after addition of the water or other solvent that may be used, further means may be employed if needed or desired to effect completion of solution.

Thus, after the water has been added, steam may be sent through the pipes to emanate from the perforations 15 and provide what might be called a blanket of steam along the bottom of the sparger pipes, the "jet" action from the holes 15 providing vigorous agitation, sufficient to rapidly dissolve the solid sugar particles which settle to the bottom of the tank. If the solvent has been introduced properly as hereinbefore described, the residual sugar behaves like a free-flowing slurry, and the solid sugar particles comprising the slurry are rapidly dissolved by direct contact with the steam and with the hot agitated solution at the bottom of the tank 11. The steam not only heats up the solution in the area where the residual sugar exists, but additionally dilutes the solution therein, causes good agitation, and provides very powerful localized action along the bottom of the car 11 causing the large refractory sugar particles in those regions to dissolve quickly.

It is seen then, that in our method a very rapid dissolving "zone" is established along the bottom of the tank car 11 with a less rapid dissolving "zone" above, the heat and dilution being concentrated where it does the most good, namely, where it can contact with large residual sugar particles.

The practice of our invention, permits a 25 ton shipment of sugar in a conventional 8,000 gallon tank car to be dissolved in as little as ten minutes. By way of comparison, just to remove solid sugar from a freight car at that rate would require a costly conveyor having a capacity of 150 tons per hour plus large dissolving and other handling apparatus to then dissolve the sugar. The present invention requires, of course, no additional container, contains no moving parts, and is fundamentally simple and inexpensive operation.

By way of illustration of one method of practicing our invention, 2,580 gallons of water at a temperature of 160° F. was added to an 8000 gallon tank car containing 25 tons of sugar in the manner above described, in a two minute period under two pound pressure.

Then, wet, saturated steam under 10 lb. gauge pressure was introduced through the sparger pipes for an eight minute period. When the temperature of the solution reached 170° F., all of the solid sugar had dissolved.

Although the above technique results in the complete transformation of solid into liquid sugar, it frequently happens that there is a more or less definite stratification of sugar solution in the vessel with the more concentrated solution at the bottom.

To eliminate such stratification, steam jet circulators are employed as shown in Figures 7, 8, 9, 10, 11, 12, and 13. Referring particularly to Figure 7, the circulators are shown at 26, and are connected to steam lines 27 and 28. A valve 29 controls the steam pressure. The circulators 26 may be positioned about 1 foot from the bottom of the car 11, and in the center thereof, as shown in Figure 8.

Each circulator 26 shown in detail in Figures 10 and 11 is formed of 2½ inch pipe 31 welded into a 3 by 1½ inch standard pipe reducer 32. A steel disc 33, is welded into the large side of the reducer and three ¾ inch pipe nozzle 34 are screwed into the disc 33, which is drilled and tapped to receive them. The shell 35 has a venturi shape, and may be six inches across the small discharge and nine inches across the suction end. Both converge to a four inch diameter throat, as shown. The disc 33 of the steam injector may be about three inches up stream from the four inch throat as indicated. Each section of circulator 26 may be, conveniently, 12 inches long, and held to the wall of the tank car 11 by a collar 36 which can be supported on legs 37 suitably welded, riveted or otherwise secured to the bottom of the car, Figure 9.

The use of the circulator 26, results in a powerful movement of the fluid in the car so that after a three to ten minute period the content of the tank car is uniform in composition. In the case of the preceding illustrative example, further treatment of the solution resulted in the temperature of the solution rising from 170° to 187° during an eight minute circulation. The Brix reading averaged 66.0 and approximately 3497 lbs. of wet steam was used for the spargers and circulators.

Figures 12 and 13 show a part of a hopper-bottom car which has been adapted for use in accordance with our novel method.

In this arrangement a pair of stand-pipes 38 having caps 39 are suitably secured to a seal plate 41 across the bottom of the hopper 42. The stand-pipes 38 in the particular form shown are 1' 0" in diameter, 2' 8" high, and contain 456 holes about 2" apart and having a diameter of 0.085".

A conduit 43, leads to a conduit 44, the latter being adapted to receive a source of solvent (water or other fluid), steam or compressed air through a connection at the ends 45 or 46. A valve 47 controls the flow of fluid from conduit 44 to conduit 43.

Agitators 48, similar to those illustrated in Figure 10 and hereinbefore described, are connected to the conduit 44 through conduit 49 which is equipped with a control valve 51.

In use, dissolving water is introduced into the sugar-containing hopper bottom car, through conduit 44, and 43 into the standpipes 38 through the perforations in the latter. The dissolving water may be followed by steam introduced through the same conduits to effect more rapid and complete dissolution of the sugar crystals. This may be followed by the introduction of steam to the agitators 48 through the conduits shown, to agitate the fluid mass in the car, eliminate possible stratification and make the fluid of uniform composition.

With this arrangement as with the modified tank car hereinbefore described, it is essential that the rate of solvent addition and the distribution of the solvent be such that the net effect is to uniformly and rapidly wet the sugar particles and have them slough downwardly in the form of a free-flowing slurry to contact the rising liquid stream before crystallization of the saturated solution can take place.

Our invention now permits for the first time, shipment of solid sugar in a tank car or tank truck to the point of use, and rapid and economical solution of the sugar at the destination in the shipping vessel. Since the dissolving takes place rapidly and by the use of simple means requiring very little supervision of labor, almost the entire savings in freight over the shipment of liquid sugar is realizable.

Our invention likewise eliminates the need for the material-handling equipment which is necessary for use with solid sugar that has to be removed from cars, which equipment is not only large and cumbersome but costly. Thus by conventional means, to dissolve 25 tons of solid sugar (equivalent to an 8000 gallons tank car of solid sugar) in fifteen minutes would require solid-handling equipment capable of moving and dissolving this sugar at the rate of about 100 tons an hour, which means of course that the equipment demands are high.

An additional advantage of our invention is that it provides a simple means for providing pasteurized or sterilized sugar syrup, in situ since our procedure is such that at the operating temperatures used thermophiles, bacteria, molds and yeast which ordinarily adversely affect sugar solutions are destroyed.

Preparation of the liquid sugar at the destination thus eliminates any possibilities of deterioration of the sugar, the latter being one of the hazards inherent in the transportation of liquid sugar.

Our invention may be practiced not only in the container or vessels used to transport the solid sugar, but also in situations involving a multiplicity of transportation units where it might be more economical to use one stationary tank at the destination, and to transport the sugar in hopper bottom cars or similar carriers from which the sugar could be readily dropped into the dissolving vessel.

The method and apparatus of our invention are of course capable of modifications within the skill of the art and within the scope of the invention. Thus, after the introduction of the solvent into the tank, compressed air could be introduced through the sparger pipes in order to agitate and cool the slurry and to complete the dissolving of the sugar. Such a modified procedure might be especially advisable where it is desired to effect solution at a low temperature. Of course the use of compressed air instead of steam for finishing the solution of the sugar would also take longer, and we have found that introduction of water at 80° F. into a tank car as hereinbefore described, followed by the use of a little steam to raise the temperature to a maximum of 120° F., followed by the use of compressed air at 45 lbs. pressure resulted in dissolving the sugar in 35 minutes.

The apparatus could of course likewise be modified. Thus a screen of supported wire, perforated plates or the like could be positioned over the bottom of the car instead of using sparger pipes, so that water, steam and air could pass therethrough uniformly enough to effect the necessary rapid wetting and solution of the particles.

And as hereinbefore stated, our invention is not limited to the dissolution of sugar, but is applicable to the treatment of soluble materials other than sugar, especially those which tend to form objectionable agglomerates or difficulty permeable fluid or solid strata on being subjected to solvent, such materials being exemplified by sodium hydroxide, alum and the like.

Insofar as use of our process in dissolving sugar is concerned, it is pointed out that our process is particularly applicable not only to the type of sugar which is identified as granulated white sugar, but also to raw sugars, remelt sugar, cane or beet sugars and soft (yellow or brown) sugars. The particle size of the solute is variable over a wide range exemplified by the particle size composition of sugars listed in the table below:

| Screen (U.S. Std.) | Extra Fine. percent | Manufacturer's Special. percent | Regular Fruit Granulated. percent | Raw. percent |
|---|---|---|---|---|
| On 18 mesh | 0.0 | 2.3 | | |
| On 30 mesh | 1.1 | 32.0 | | |
| On 50 mesh | 56.2 | 52.5 | 0.6 | |
| On 60 mesh | 16.2 | 7.0 | | |
| On 70 mesh | | | 1.3 | |
| On 80 mesh | 17.4 | 4.7 | 12.1 | |
| On 100 mesh | 4.9 | 0.9 | 31.5 | |
| Thru 100 mesh | 4.2 | 0.6 | | |
| On 140 mesh | | | 30.0 | |
| On 200 mesh | | | 17.2 | |
| Thru 200 mesh | | | 7.3 | |
| On 16 mesh | | | | 5.7 |
| On 30 mesh | | | | 71.5 |
| On 50 mesh | | | | 22.5 |
| Thru 50 mesh | | | | 0.3 |

A further attractive and important feature of our new process is exemplified in the production of what is known as invert sugar. A mixture of sucrose and invert sugar crystallizes at a much lower temperature than a solution containing a corresponding percentage of sucrose alone, and is particularly useful in satisfying demands for a liquid sugar with a sugar concentration which is so great that, were it composed of sucrose alone, crystallization would take place at ambient temperatures. Also, a solution high in sugar concentration, beyond the solubility of sucrose alone at room temperatures is much more resistant to bacterial growth than weaker solutions. There is, therefore, frequent demand by consumers who require extra strong solutions to resist bacterial growth during longer periods of storage, which demand can be supplied by a solution containing invert sugar and sucrose.

Our process is admirably suited for producing invert sugar-sucrose solution; thus, after dissolving sucrose in accordance with our hereinbefore described process, the resulting sucrose solution is hot, strong and in an ideal condition for inversion which is carried out by adding the required amount of invertase or acid (such as citric or hydrochloric) for an adequate time to reach the degree of inversion desired, followed by the addition of soda or caustic to neutralize the acid and terminate the inversion process.

Such certain changes in carrying out the process of our invention, and certain modifications in the apparatus which embodies the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:
1. The improved method of forming a free flowing slurry of particulate highly soluble crystalline material while the same is massed in a large static body within a closed tank, comprising the steps of, uniformly and rapidly wetting the crystals of the static body by means of multiple high velocity jet streams of solvent, the solvent being supplied at a rate and volume sufficient to substantially prevent local recrystallization of dissolved crystals and provide free flowing mobility to undissolved residual crystals, and simultaneously evacuating air from the tank to accelerate wetting of the crystals and surround the same with solvent.

2. A method for forming free flowing slurry from crystalline sugar while the same is contained in a closed tank, as a static mass, comprising the steps of, rapidly wetting the sugar particles of the mass by applying plural jet streams of heated water thereto at a rate sufficient to dissolve the finer sugar particles, substantially prevent their local recrystallization and provide free flowing mobility to the residual undissolved particles, simultaneously removing air from between the particles of the mass to accelerate the wetting activity of the water and to surround the undissolved particles with water, and thereafter subjecting the resulting slurry of solvent and dissolved and residual particles to agitation by means of multiple high velocity jet streams of steam and air.

3. An improved method for removing massed crystalline sugar from the interior of a closed tank, comprising the steps of, rapidly and uniformly wetting the sugar crystals with water, evacuating air from the tank to remove the same from the interstices between crystals, replacing such evacuated air with water in order to surround the crystals with a solvent at a rate sufficient to substantially prevent local recrystallization of dissolved particles and assure relatively free mobility to undissolved particles, and thereafter removing the dissolved and undissolved particles and water from the tank as slurry.

References Cited in the file of this patent

UNITED STATES PATENTS

| 26,007 | Aspinwall | Nov. 8, 1859 |
| 125,654 | Hocking | Apr. 9, 1872 |
| 334,972 | Newhall | Jan. 26, 1886 |
| 463,564 | Wilson | Nov. 17, 1891 |
| 535,719 | Newhall | Mar. 12, 1895 |
| 623,772 | Duey | Apr. 25, 1899 |
| 678,440 | Smith | July 16, 1901 |
| 692,020 | Lambert | Jan. 28, 1902 |

FOREIGN PATENTS

| 5,787 | Great Britain | of 1900 |
| 195,780 | Great Britain | Apr. 12, 1923 |
| 450,198 | Great Britain | July 13, 1936 |
| 724,027 | Great Britain | Feb. 16, 1955 |